E. M. SALISBURY.
ADJUSTABLE PAN FOR WASHTUBS.
APPLICATION FILED SEPT. 12, 1916.

1,224,024. Patented Apr. 24, 1917.

Witness
Fenton S. Belt

Inventor
E. M. Salisbury
By A. L. Hough
Attorney

UNITED STATES PATENT OFFICE.

ELIZABETH MAY SALISBURY, OF PARKERS PRAIRIE, MINNESOTA.

ADJUSTABLE PAN FOR WASHTUBS.

1,224,024. Specification of Letters Patent. Patented Apr. 24, 1917.

Application filed September 12, 1916. Serial No. 119,781.

*To all whom it may concern:*

Be it known that I, ELIZABETH MAY SALISBURY, a citizen of the United States, residing at Parkers Prairie, in the county of Otter Tail and State of Minnesota, have invented certain new and useful Improvements in Adjustable Pans for Washtubs, of which the following is a specification, reference being had therein to the accompanying drawing.

This invention relates to new and useful improvements in adjustable pans for use on wash tubs, etc., and the object of the invention is to produce a simple device of this character, having various details of construction, combinations and adaptations of parts which will be hereinafter fully described, and then specifically defined in the appended claim.

My invention is clearly illustrated in the accompanying drawings, in which drawings similar letters of reference indicate like parts in the various views and in which:—

Figure 1:
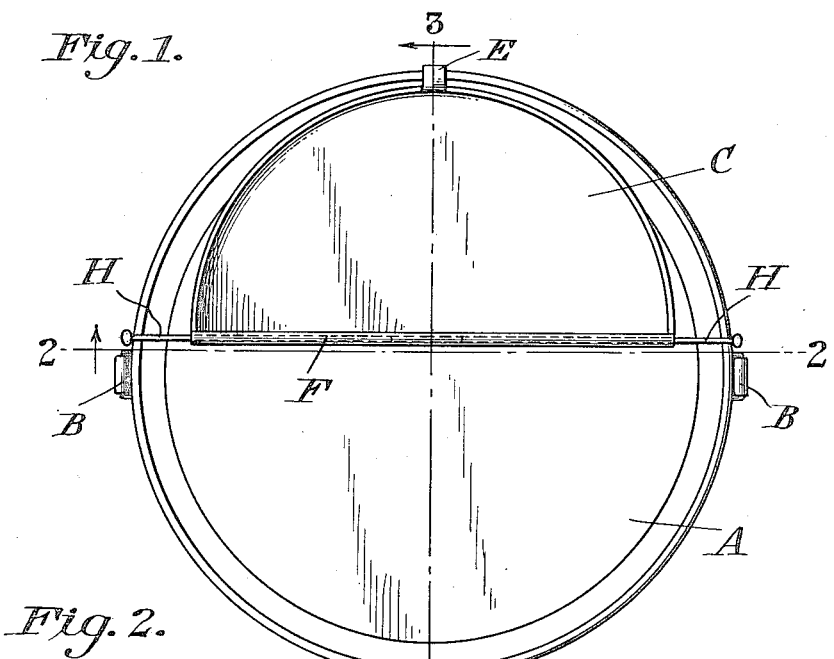
Figure 1 is a top plan view showing the application of the pan to a tub.
Figure 2:
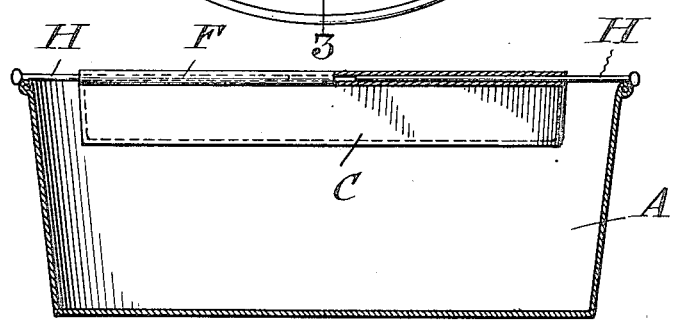
Fig. 2 is a cross sectional view taken on line 2—2 of Fig. 1.
Figure 3:
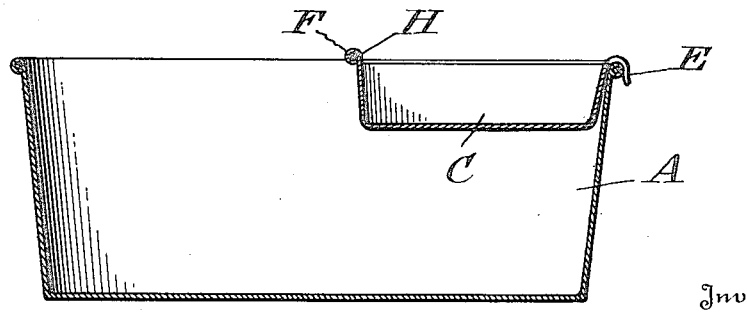
Fig. 3 is a sectional view taken on line 3—3 of Fig. 1.

Reference now being had to the details of the drawings by letter, A designates a wash tub, which may be either circular outlined, square or other shape, and B designate handles, and C is a pan, which in the present instance is shown as semicylindrical in shape, the convexed edge having a hook E which engages over the edge of the tub. The straight edge of the pan has a tube F secured thereto and H, H are rods, the inner end portions of which telescope within said tube, and the outer ends of the rods are adapted to rest upon the upper edge of the tub and serve as a supporting means for the straight portion of said pan. By this means it will be noted that the pan is made to be adjusted to be fitted to tubs of different size and shapes. When the pan is adjusted in place, a wringer may be attached to the edge of the tub at suitable locations one on either side of the hook on the pan and which supports the outer edge thereon.

By the adjustable rods, it will be noted that the pan may be held to various sizes of tubs by simply drawing the rods apart or pushing same toward each other. The ends of the rods being provided with enlarged portions will tend to hold the rods over the ends of the tub.

By the provision of the pan, mounted as shown and described it will be noted that a means is provided for use for starching the clothes and for wringing the starched clothes without changing to a different tub, thus saving a considerable amount of labor in the laundering of the clothes.

What I claim to be new is,—

An adjustable pan for wash tubs having a circumferential flange, the inner edge of said pan being provided with a longitudinal roll, an extensible rod telescoping within said roll and having heads at their outer ends, a hook integral with the inner edge of the pan and adapted to engage over the edge of the tub, the upper edge of the flange of the pan being flush with the upper edge of the receptacle supporting the pan.

In testimony whereof I hereunto affix my signature in presence of two witnesses.

ELIZABETH MAY SALISBURY.

Witnesses:
E. V. ANDERSON,
ROSS CLARNO.